US012354584B2

(12) United States Patent
Li et al.

(10) Patent No.: US 12,354,584 B2
(45) Date of Patent: Jul. 8, 2025

(54) ACTIVE NOISE CANCELLATION METHOD AND ACTIVE NOISE CANCELLATION EARPHONES

(71) Applicant: SHENZHEN GOODIX TECHNOLOGY CO., LTD., Guangdong (CN)

(72) Inventors: Guoliang Li, Guangdong (CN); Lelin Wang, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 265 days.

(21) Appl. No.: 18/119,425

(22) Filed: Mar. 9, 2023

(65) Prior Publication Data

US 2024/0096308 A1 Mar. 21, 2024

Related U.S. Application Data

(63) Continuation of application No. PCT/CN2022/142987, filed on Dec. 28, 2022.

(30) Foreign Application Priority Data

Sep. 21, 2022 (CN) .......................... 202211153118.9

(51) Int. Cl.
*H04R 1/10* (2006.01)
*G10K 11/178* (2006.01)

(52) U.S. Cl.
CPC .. *G10K 11/17815* (2018.01); *G10K 11/17817* (2018.01); *G10K 11/17823* (2018.01);
(Continued)

(58) Field of Classification Search
CPC .............. H04R 1/1083; H04R 2460/01; G10K 2210/108; G10K 2210/1081; G10K 2210/1082
See application file for complete search history.

(56) References Cited

U.S. PATENT DOCUMENTS

2012/0308027 A1 12/2012 Kwatra
2018/0308465 A1 10/2018 Zhou et al.
(Continued)

FOREIGN PATENT DOCUMENTS

CN 112788466 A 5/2021
CN 113630684 A 11/2021
(Continued)

OTHER PUBLICATIONS

European Patent Office Action in European Application No. 22857006.5, dated Oct. 4, 2024, 4 pages.
(Continued)

*Primary Examiner* — Ping Lee
(74) *Attorney, Agent, or Firm* — Finnegan, Henderson, Farabow, Garrett & Dunner, LLP

(57) ABSTRACT

An active noise cancellation method and active noise cancellation earphones are provided, which may improve a noise cancellation effect of the active noise cancellation earphones. The method includes: determining a first primary path transfer function according to a first out-of-ear data collected by the out-of-ear microphone and a first in-ear data collected by the in-ear microphone when the speaker plays audio data; determining audio data received by the in-ear microphone according to the first in-ear data, the first out-of-ear data and the first primary path transfer function; determining a first secondary path transfer function according to the audio data played through the speaker and the audio data received by the in-ear microphone; and updating an operation coefficient of the filter to a first operation coefficient according to the first primary path transfer function and/or the first secondary path transfer function.

20 Claims, 3 Drawing Sheets

(52) U.S. Cl.
CPC .. *G10K 11/17825* (2018.01); *G10K 11/17881* (2018.01); *H04R 1/1083* (2013.01); *G10K 2210/1081* (2013.01); *G10K 2210/3022* (2013.01); *G10K 2210/3026* (2013.01); *G10K 2210/3027* (2013.01); *G10K 2210/3028* (2013.01); *G10K 2210/3044* (2013.01); *G10K 2210/3054* (2013.01); *G10K 2210/3055* (2013.01); *H04R 2460/01* (2013.01)

(56) References Cited

U.S. PATENT DOCUMENTS

| | | | | |
|---|---|---|---|---|
| 2021/0020157 | A1* | 1/2021 | Zhou ................ | G10K 11/17854 |
| 2021/0400398 | A1 | 12/2021 | McCutcheon | |
| 2023/0080298 | A1 | 3/2023 | Yu et al. | |

FOREIGN PATENT DOCUMENTS

| | | | |
|---|---|---|---|
| CN | 114040285 | A | 2/2022 |
| CN | 114666702 | A | 6/2022 |
| CN | 114944143 | A | 8/2022 |
| CN | 115396774 | A | 11/2022 |
| WO | 2021227696 | A1 | 11/2021 |

OTHER PUBLICATIONS

Liu et al., "Intelligent active noise reduction headsets based on DSP," Scientific and Technological Innovation, Oct. 15, 2017, 3 pages.
European Patent Office Action in European Application No. 22857006.5, dated Apr. 10, 2025, 4 pages.

* cited by examiner

ACTIVE NOISE CANCELLATION METHOD AND ACTIVE NOISE CANCELLATION EARPHONES

CROSS-REFERENCE TO RELATED APPLICATION

This application is a continuation of International Application No. PCT/CN2022/142987, filed on Dec. 28, 2022, which claims priority to Chinese Patent Application No. 202211153118.9, filed on Sep. 21, 2022. The disclosures of the aforementioned applications are hereby incorporated by reference in their entireties.

TECHNICAL FIELD

The present application relates to the field of multimedia technologies, and more specifically, to an active noise cancellation method and active noise cancellation earphones.

BACKGROUND

When a user wears earphones to listen to music or make a voice call, when there is ambient noise outside, a definition of music or a voice signal the user hears will be affected, and when the ambient noise is relatively serious, the user cannot even hear the audio information in the earphones, so that the ambient noise greatly reduces the earphones wearer's experience. Active noise cancellation earphones try to send out an audio signal with a similar amplitude and an opposite phase to the ambient noise through a speaker in the earphones to achieve an effect of offsetting the ambient noise and reducing the noise heard by the earphones wearer.

However, a noise cancellation effect of earphones is greatly affected by different wearing methods and ear canal structures. Different users have different ear canal structures, and different wearing methods will lead to different relative positions between the earphones and the human ears, and a gap generated thereby will have different effects on noise and an in-ear echo. Even if the same user uses the same earphones, each time the user wears the earphones, the locations of the earphones in the human ears are not completely consistent, which will also affect the user's wearing effect. Therefore, how to improve the noise cancellation effect of the earphones, so as to avoid the impact of external noise on the earphones wearer in different wearing environments as much as possible is an urgent problem to be solved.

SUMMARY

Embodiments of the present application provide an active noise cancellation method and active noise cancellation earphones, which may improve an effect of active noise cancellation.

In a first aspect, an active noise cancellation method is provided for active noise cancellation earphones, the active noise cancellation earphones include an in-ear microphone, an out-of-ear microphone, a speaker and a filter, and the method includes: determining a first primary path transfer function according to a first out-of-ear data collected by the out-of-ear microphone and a first in-ear data collected by the in-ear microphone when the speaker plays audio data; determining audio data received by the in-ear microphone according to the first in-ear data, the first out-of-ear data and the first primary path transfer function; determining a first secondary path transfer function according to the audio data played through the speaker and the audio data received by the in-ear microphone; and updating an operation coefficient of the filter to a first operation coefficient according to the first primary path transfer function and/or the first secondary path transfer function.

In the technical solutions in the embodiments of the present application, a first primary path transfer function and a first secondary path transfer function may be determined based on audio data normally played through an speaker; and an operation coefficient of the filter may be updated to a first operation coefficient according to the first primary path transfer function and/or the first secondary path transfer function. The method may be applied to any stage when the active noise cancellation earphones normally play the audio data through the speaker, and may be executed many times to realize real-time update of the operation coefficient of the filter during the use of the active noise cancellation earphones. In this way, even if the environment changes or the locations of the active noise cancellation earphones and ear canals changes during the use of the active noise cancellation earphones by the wearer, the operation coefficient of the filter may be updated in real time through the method, and then the noise cancellation effect of the active noise cancellation earphones may be adjusted to make the wearer have a good use experience. In addition, the method determines the operation coefficient of the filter according to the audio data played through the speaker without adding an additional or a specific audio signal. For example, it does not need to add an audio signal outside a hearing range of the wearer, which may not only simplify the active noise cancellation earphones, but also may avoid an impact of additional audio signal on the wearer, and may not only ensure the noise cancellation effect of the active noise cancellation earphones, but also ensure the wearer's using experience.

In a possible implementation manner, the updating an operation coefficient of the filter to a first operation coefficient according to the first primary path transfer function and/or the first secondary path transfer function includes: determining the first operation coefficient corresponding to the first primary path transfer function according to corresponding relationships between different primary path transfer functions and different operation coefficients of the filter, and updating the operation coefficient of the filter to the first operation coefficient; and/or, determining the first operation coefficient corresponding to the first secondary path transfer function according to corresponding relationships between different secondary path transfer functions and different operation coefficients of the filter, and updating the operation coefficient of the filter to the first operation coefficient.

In a possible implementation manner, the filter is an adaptive filter.

In a possible implementation manner, the method further includes: determining an update step of the filter according to a detection result of a wearing environment of the active noise cancellation earphones.

In a possible implementation manner, the detection result of the wearing environment of the active noise cancellation earphones includes at least one of the followings: a self-sounding detection result of an earphones wearer, an ambient wind noise detection result and an earphones squeak detection result.

In a possible implementation manner, the determining an update step of the filter according to a detection result of a wearing environment of the active noise cancellation earphones includes: reducing the update step of the filter when the detection result of the wearing environment of the active noise cancellation earphones is greater than or equal to a preset value; and/or, increasing the update step of the filter when the detection result of the wearing environment of the active noise cancellation earphones is less than the preset value.

In a possible implementation manner, the determining audio data received by the in-ear microphone according to the first in-ear data, the first out-of-ear data and the first primary path transfer function includes: determining a first in-ear passive noise data according to the first out-of-ear data and the first primary path transfer function; and determining the audio data received by the in-ear microphone according to the first in-ear data and the first in-ear passive noise data.

In a possible implementation manner, the determining the audio data received by the in-ear microphone according to the first in-ear data and the first in-ear passive noise data includes: determining a difference between the first in-ear data and the first in-ear passive noise data as the audio data received by the in-ear microphone.

In a possible implementation manner, the method further includes: collecting the first in-ear data by the in-ear microphone while collecting the first out-of-ear data by the out-of-ear microphone when the speaker plays the audio data.

In a possible implementation manner, the method further includes: determining a second primary path transfer function according to a second out-of-ear data collected by the out-of-ear microphone and a second in-ear data collected by the in-ear microphone when the speaker plays prompt tone data, and the prompt tone data played through the speaker being configured to prompt a start of a noise cancellation function; determining prompt tone data received by the in-ear microphone according to the second in-ear data, the second out-of-ear data and the second primary path transfer function; determining a second secondary path transfer function according to the prompt tone data played through the speaker and the prompt tone data received by the in-ear microphone; and updating the operation coefficient of the filter to a second operation coefficient according to the second primary path transfer function and/or the second secondary path transfer function.

In a possible implementation manner, the updating the operation coefficient of the filter to a second operation coefficient according to the second primary path transfer function and/or the second secondary path transfer function includes: determining the second operation coefficient corresponding to the second primary path transfer function according to corresponding relationships between different primary path transfer functions and different operation coefficients of the filter, and updating the operation coefficient of the filter to the second operation coefficient; and/or, determining the second operation coefficient corresponding to the second secondary path transfer function according to corresponding relationships between different secondary path transfer functions and different operation coefficients of the filter, and updating the operation coefficient of the filter to the second operation coefficient.

In a possible implementation manner, the updating the operation coefficient of the filter to a second operation coefficient includes: updating the operation coefficient of the filter from the first operation coefficient to the second operation coefficient.

In a possible implementation manner, the updating an operation coefficient of the filter to a first operation coefficient includes: updating the operation coefficient of the filter from the second operation coefficient to the first operation coefficient.

In a possible implementation manner, the filter includes at least one of the following: a Feed-Forward FF filter, a Feed-Back FB filter and a Secondary Path SP filter.

In a possible implementation manner, the determining a first primary path transfer function according to a first out-of-ear data collected by the out-of-ear microphone and a first in-ear data collected by the in-ear microphone includes: determining the first primary path transfer function through an adaptive filtering algorithm according to the first out-of-ear data and the first in-ear data.

In a possible implementation manner, the determining a first secondary path transfer function according to the audio data played through the speaker and the audio data received by the in-ear microphone includes: determining the first secondary path transfer function through the adaptive filtering algorithm according to the audio data played through the speaker and the audio data received by the in-ear microphone.

In a second aspect, active noise cancelation earphones is provided, the active noise cancelation earphones include: an in-ear microphone, an out-of-ear microphone, a speaker, a filter and a processor, and the processor is configured to: determine a first primary path transfer function according to a first out-of-ear data collected by the out-of-ear microphone and a first in-ear data collected by the in-ear microphone when the speaker plays audio data; determine audio data received by the in-ear microphone according to the first in-ear data, the first out-of-ear data and the first primary path transfer function; determine a first secondary path transfer function according to the audio data played through the speaker and the audio data received by the in-ear microphone; and update an operation coefficient of the filter to a first operation coefficient according to the first primary path transfer function and/or the first secondary path transfer function.

The processor may be configured to execute the methods in the implementation manner according to the first aspect or any possible embodiments of the first aspect.

DESCRIPTION OF EMBODIMENTS

Technical solutions in embodiments of the present application will be described hereinafter in combination with accompanying drawings.

It should be understood that the embodiments of the present application may be applied to ANC earphones with an active noise cancellation (ANC) function. Specifically, the ANC earphones send out an audio signal with a similar amplitude but an opposite phase to the ambient noise through a speaker, thereby reducing the noise heard by the earphones wearer. At present, the common types of the earphones on the market include: in-ear, semi-in-ear, over-ear (also known as earmuff), close-to-ear, semi-open, and so on, where the in-ear and semi-in-ear earphones with the ANC function are generally equipped with rubber sleeves in order to make the earphones fit human ears better, so as to play a role in physical isolation of ambient noise. Although the earphones with rubber sleeves may achieve a better effect of physical isolation, the stimulation of the rubber sleeves on ear canals will affect the wearing comfort of a user. For example, semi-open earphones generally do not have the rubber sleeves, which are more comfortable to wear and suitable for a long time wearing. However, due to the lack of the rubber sleeves, the noise isolation effect is not as good as that of the earphones with rubber sleeves, which may affect the user experience in a noisy environment.

An embodiment of the present application provides a noise cancellation method for ANC earphones and ANC earphones, and the ANC earphones have an ANC function. For example, the ANC earphones may be in-ear, semi-in-ear and close-to-ear earphones with rubber sleeves, or the ANC earphones may also be semi-open earphones without rubber sleeves, but an embodiment of the present application does not limit this.

Figure 1:
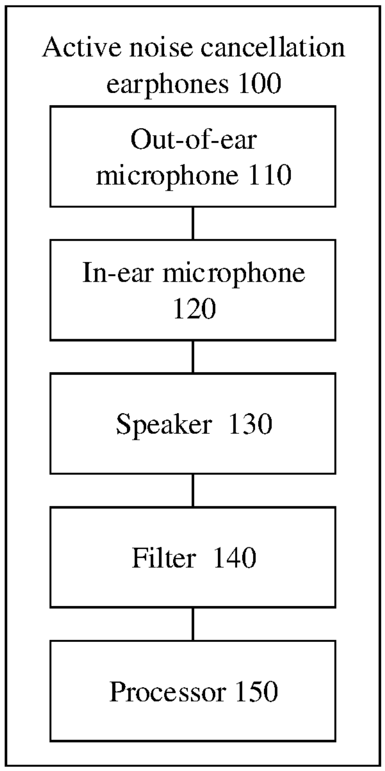
FIG. 1 is a schematic block diagram of active noise cancellation earphones according to an embodiment of the present application.
Figure 2:
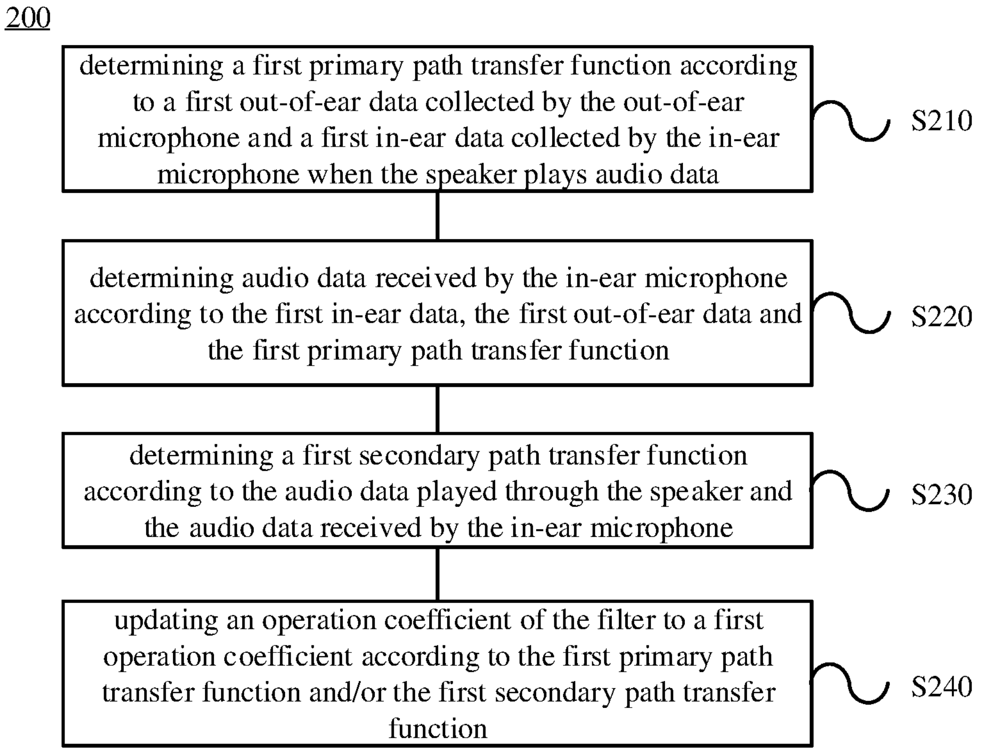
FIG. 2 is a schematic flowchart of an active noise cancellation method according to an embodiment of the present application.

FIG. 1 shows a schematic block diagram of ANC earphones 100 according to an embodiment of the present application. As shown in FIG. 1, the ANC earphones 100 may include an out-of-ear microphone 110, an in-ear microphone 120, a speaker 130, a filter 140, and a processor 150. FIG. 2 shows a schematic flowchart of a method 200 for noise cancellation for the ANC earphones according to an embodiment of the present application. Optionally, as shown in FIG. 2, the method 200 may be applied to the ANC earphones, for example, it may be applied to the ANC earphones 100 shown in FIG. 1, and it may be executed by the processor 150 of the ANC earphones 100. For convenience of explanation, the following text is described by taking the processor 150 executes the method 200 as an example.

As shown in FIG. 2, the method 200 includes: S210, determining a first primary path transfer function according to a first out-of-ear data collected by the out-of-ear microphone 110 and a first in-ear data collected by the in-ear microphone 120 when the speaker 130 plays audio data; S220, determining audio data received by the in-ear microphone 120 according to the first in-ear data, the first out-of-ear data and the first primary path transfer function; S230, determining a first secondary path transfer function according to the audio data played through the speaker 130 and the audio data received by the in-ear microphone 120; and S240, updating an operation coefficient of the filter 140 to a first operation coefficient according to the first primary path transfer function and/or the first secondary path transfer function.

It should be understood that the audio data played through the speaker 130 in an embodiment of the present application may refer to: audio data selected by the wearer of the ANC earphones 100 played through the speaker 130 when the ANC function of the ANC earphones 100 is turned on, and/or audio data of an anti-noise signal used to eliminate noise interference played through the speaker 130. Specifically, the audio data selected by the wearer of the ANC earphones 100 played through the speaker 130 refers to: audio data that the wearer wants to hear, for example, audio content that may include music, a voice call or a recording that the wearer selects to play. In addition, because a wearing environment of the ANC earphones 100 may have various noise interference, for example, if the wearer tries to listen to audio in a noisy environment, there will be noise interference of ambient sound that will interfere with the listening experience; and for another example, a specific relationship between the ANC earphones 100 and ear physiology of the wearer may also produce another part of noise interference that may be heard by the wearer but will prevent the earphones from providing desired audio to the wearer in a best way. If the ANC function of the ANC earphones 100 is turned on, the ANC earphones 100 need to play the anti-noise signal to offset the above noise interference, so as to realize the ANC function of the ANC earphones 100. That is, the audio data of the anti-noise signal played through the speaker 130 is used to offset various noise interference.

Optionally, for different scenarios, the audio data played through the speaker 130 may include a variety of situations. For example, if the wearer of the ANC earphones 100 is currently playing any audio data and there is noise interference in the wearing environment, the audio data played through the speaker 130 includes both the audio data selected by the wearer of the ANC earphones 100 played through the speaker 130 and the audio data of the anti-noise signal used to eliminate noise interference played through the speaker 130. For another example, if the wearer of the ANC earphones 100 does not currently select to play any audio data, for example, the wearer may use the ANC earphones 100 as an earplug, the audio data played through the speaker 130 may include the audio data of the anti-noise signal used to eliminate noise interference played through the speaker 130, but does not include the audio data selected by the wearer to play. An embodiment of the present application is not limited to this.

Therefore, the noise cancellation method 200 for the ANC earphones 100 in an embodiment of the present application may determine the first primary path transfer function and the first secondary path transfer function according to the first out-of-ear data collected by the out-of-ear microphone 110 and the first in-ear data collected by the in-ear microphone 120 when the speaker 130 normally plays the audio data; then, update the operation coefficient of the filter 140 to the first operation coefficient according to the first primary path transfer function and/or the first secondary path transfer function. The method 200 may be applied to any stage when the ANC earphones 100 normally play the audio data through the speaker 130, and may be executed many times to realize real-time update of the operation coefficient of the filter 140 during the use of the ANC earphones 100. In this way, even if the environment changes or the locations of the ANC earphones 100 and ear canals changes during the use of the ANC earphones 100 by the wearer, the operation coefficient of the filter 140 may be updated in real time through the method 200, and then the noise cancellation effect of the ANC earphones 100 may be adjusted to make the wearer have a good use experience. In addition, the method 200 determines the operation coefficient of the filter 140 according to the audio data played through the speaker 130 without adding an additional or a specific audio signal. For example, it does not need to add an audio signal outside a hearing range of the wearer, which may not only simplify the ANC earphones 100, but also may avoid an impact of the additional audio signal on the wearer, and may not only ensure the noise cancellation effect of the ANC earphones 100, but also ensure the wearer's using experience.

It should be understood that the out-of-ear microphone 110 in an embodiment of the present application may also be referred to as a reference mic. The out-of-ear microphone 110 is usually located at a shell of the ANC earphones 100 to collect data outside the ear of the wearer. Specifically, the out-of-ear microphone 110 is mainly used to collect out-of-ear audio data. For example, the out-of-ear microphone 110 may collect the noise generated in the surrounding environment of the wearer, and may also collect an audio component that the audio data played through the speaker 130 leaks into the surrounding environment.

Optionally, the method 200 may further include: the first out-of-ear data is collected by the out-of-ear microphone 110 when the speaker 130 plays the audio data, where the first out-of-ear data may include the noise generated in the surrounding environment of the wearer, and may further include the audio component that the audio data played through the speaker 130 collected by the out-of-ear microphone 110 leaks into the surrounding environment.

It should be understood that the in-ear microphone 120 in an embodiment of the present application may also be referred to as an error mic, the in-ear microphone 120 is usually located on an inside of the ANC earphones 100 and near an ear canal to collect data inside the ear. Specifically, the in-ear microphone 120 is mainly used to collect the in-ear data, for example, the in-ear microphone 120 may collect the audio data played through the speaker 130. In addition, noise data may also be collected, and the noise data is an in-ear passive noise data. For example, the in-ear passive noise data may include an audio echo signal that may be generated when the speaker 130 plays the audio data, and a residual signal in the ear after the cancellation of a noise signal and an anti-noise signal in the air.

Optionally, the method 200 may further include: the first in-ear data is collected by the in-ear microphone 120 when the speaker 130 plays the audio data, where the first in-ear data may include the audio data played through the speaker 130 received by the in-ear microphone 120, and may further include an in-ear noise data.

In an embodiment of the present application, in S210, a first primary path transfer function may be determined according to a first out-of-ear data collected by an out-of-ear microphone 110 and a first in-ear data collected by an in-ear microphone 120*w*, where the first primary path transfer function in an embodiment of the present application represents a transfer function from the out-of-ear microphone 110 to the in-ear microphone 120. Specifically, the method for determining a first primary path transfer function in an embodiment of the present application may be flexibly set according to the actual application. For example, the S210 in the method 200 may specifically include: determining the first primary path transfer function through an adaptive filtering algorithm according to the first out-of-ear data and the first in-ear data. Where the adaptive filtering algorithm may be selected according to the actual application, for example, a Least Mean Square (LMS) algorithm or a Recursive least squares (RLS) algorithm may be used. An embodiment of the present application is not limited to this.

Optionally, the method 200 may include: collecting the first in-ear data by the in-ear 120 microphone while collecting the first out-of-ear data by the out-of-ear microphone 110 when the speaker 130 plays the audio data. An accuracy of the first primary path transfer function may be improved while collecting the first out-of-ear data and the first in-ear data at the same time.

In an embodiment of the present application, in S220, determining audio data received by the in-ear microphone 120 according to the first in-ear data, the first out-of-ear data and the first primary path transfer function, where the audio data received by the in-ear microphone 120 represents part data of the first in-ear data received by the in-ear microphone 120, and this part of data is the audio data received by the in-ear microphone 120 after the audio data being played through the speaker 130.

Optionally, the S220 may specifically include: determining a first in-ear passive noise data according to the first out-of-ear data and the first primary path transfer function; and determining audio data received by the in-ear microphone 120 according to the first in-ear data and the first in-ear passive noise data. Specifically, since the first out-of-ear data collected by the out-of-ear microphone 110 mainly includes ambient noise out of the ear, the first in-ear passive noise data may be estimated and determined based on the first out-of-ear data and the first primary path transfer function, where the first in-ear passive noise data represents a noise signal or noise data that may exist in the ear. In this way, since the first in-ear data collected by the in-ear microphone 120 includes the first in-ear passive noise data and the audio data received by the in-ear microphone 120, the audio data received by the in-ear microphone 120 may be determined based on the determined first in-ear passive noise data and the first in-ear data.

For example, the determining audio data received by the in-ear microphone 120 according to the first in-ear data and the first in-ear passive noise data may specifically include: determining a difference between the first in-ear data and the first in-ear passive noise data as the audio data received by the in-ear microphone 120, that is, the audio data received by the in-ear microphone 120 may be obtained by the means of the first in-ear data subtracting the determined first in-ear passive noise data.

In this way, in S230, the determining a first secondary path transfer function according to the audio data played through the speaker 130 and the audio data received by the in-ear microphone 120, where the first secondary path transfer function represents a transfer function from the speaker 130 to the in-ear microphone 120. Specifically, the method for determining the first secondary path transfer function in an embodiment of the present application may be flexibly set according to the actual application. For example, the S230 in the method 200 may specifically include: determining the first secondary path transfer function through an adaptive filtering algorithm according to the audio data played through the speaker 130 and the audio data received by the in-ear microphone 120. Where the adaptive filtering algorithm may be selected according to the actual application, for example, an LMS algorithm or an RLS algorithm may be selected; moreover, an algorithm for determining the first primary path transfer function may be the same or different from an algorithm for determining the first secondary path transfer function. An embodiment of the present application is not limited to this.

In an embodiment of the present application, in S240, updating an operation coefficient of the filter 140 to a first operation coefficient according to the first primary path transfer function and/or the first secondary path transfer function. Specifically, the operation coefficient of the filter 140 may be determined by reasonably selecting any method based on the actual application according to the determined first primary path transfer function and/or the first secondary path transfer function. Where the filter 140 in an embodiment of the present application may include any one or more filters in the ANC earphones 100, for example, the filter 140 includes at least one of the following: a Feed-Forward (FF) filter, a Feed-Backward, (FB) filter and a Secondary Path (SP) filter.

Optionally, an FF filter in an embodiment of the present application may be used to filter the data collected by the out-of-ear microphone 110, for example, the FF filter may be used to filter the first out-of-ear data; an FB filter may be used to filter the data collected by the in-ear microphone 120, for example, the FB filter may be used to filter the first in-ear data; and an SP filter may be used to filter the audio data played through the speaker 130.

Optionally, as an embodiment, the first operation coefficient may be determined according to a preset corresponding relationship. Specifically, the S240 may specifically include: determining the first operation coefficient corresponding to the first primary path transfer function according to corresponding relationships between different primary path transfer functions and different operation coefficients of the filter 140, and updating the operation coefficient of the filter 140 to the first operation coefficient; and/or, determining the first operation coefficient corresponding to the first secondary path transfer function according to corresponding relationships between different secondary path transfer functions and different operation coefficients of the filter 140, and updating the operation coefficient of the filter 140 to the first operation coefficient.

In an embodiment of the present application, an operation coefficient corresponding to the first primary path transfer function may be determined as the first operation coefficient according to the preset corresponding relationship between different primary path transfer functions and different operation coefficients of the filter 140, so as to update the operation coefficient of the filter 140 to the first operation coefficient. Alternatively, an operation coefficient corresponding to the first secondary path transfer function may be determined as the first operation coefficient according to the preset corresponding relationship between different secondary path transfer functions and different operation coefficients of the filter 140, so as to update the operation coefficient of the filter 140 to the first operation coefficient. In addition, the above method may also be used in combination, for example, the operation coefficient corresponding to the first primary path transfer function may be determined to be a third operation coefficient according to the preset corresponding relationship between different primary path transfer functions and different operation coefficients of the filter 140; and the operation coefficient corresponding to the first secondary path transfer function is determined as a fourth operation coefficient according to the preset corresponding relationship between different secondary path transfer functions and different operation coefficients of the filter 140, and then based on a certain preset rule, the first operation coefficient is determined according to the third operation coefficient and the fourth operation coefficient. For another example, the preset corresponding relationship may also include the primary path transfer function and the secondary path transfer function at the same time, that is, the operation coefficients corresponding to the first primary path transfer function and the second secondary path transfer function are determined as the first operation coefficient according to the preset corresponding relationship between different operation coefficients of the filter 140 and different primary path transfer functions and the secondary path transfer functions, so that the operation coefficient of the filter 140 is updated to the first operation coefficient.

Optionally, for different filters in the ANC earphones 100, corresponding operation coefficients may be determined according to the same or different corresponding relationship described above. For example, for the FF filter, a first operation coefficient of the FF filter may be determined according to the corresponding relationship between different operation coefficients of the FF filter and different primary path transfer functions and the secondary path transfer functions. For another example, for the FB filter, an operation coefficient of the FB filter may be determined and updated as the first operation coefficient according to the preset corresponding relationship between different secondary path transfer functions and different operation coefficients of the FB filter. For another example, for the SP filter, an operation coefficient of the SP filter may be determined and updated as the first operation coefficient according to the preset corresponding relationship between different secondary path transfer functions and different operation coefficients of the SP filter, but an embodiment of the present application is not limited to this.

Optionally, as another embodiment, an adaptive filter may be used to calculate the operation coefficient of the filter 140 in real time. Specifically, the filter 140 in an embodiment of the present application is an adaptive filter, that is, any filter 140 in an embodiment of present application may use an adaptive filter, and for example, a Finite Impulse Response (FIR) filter or an Infinite Impulse Response (IIR) filter may be used. In this way, the adaptive filter may update the operation coefficient in real time according to different primary path transfer functions and/or different secondary path transfer functions determined at different times. For example, a currently used operation coefficient may be updated to the first operation coefficient according to a currently determined first primary path transfer function and/or the first secondary path transfer function.

It should be understood that different ways of determining the operation coefficient of the filter 140 in the S240 of an embodiment of the present application may be used alone or in combination with each other; and in addition, S210 to S240 in the above method 200 of an embodiment of the present application may be executed once or more during the turn-on and use of the ANC function of the ANC earphones 100. An embodiment of the present application is not limited to this.

For example, the ANC earphones 100 may repeatedly execute S210 to S240 in the above method 200 for many times during the turn-on and use of the ANC function of the ANC earphones 100 to update the operation coefficient of the filter 140 in real time, that is, the ANC earphones 100 may determine the primary path transfer function and the secondary path transfer function in real time to determine and update the operation coefficient of the corresponding filter 140. Where, S210 to S240 in the above method 200 may correspond to the update of filter 140 at any time or in any time.

Specifically, if the ANC earphones 100 repeatedly execute S210 to S240 in the above method 200 for many times during the turn-on and use of the ANC function of the ANC earphones 100, then for any execution process, determining the first primary path transfer function and the first secondary path transfer function, and determining the corresponding first operation coefficient, and updating the current operation coefficient of the filter 140 to the first operation coefficient; and for a next execution process, the primary path transfer function and the secondary path transfer function may be determined again, and a corresponding new operation coefficient may be determined, and then the current first operation coefficient of the filter 140 will be updated to a new operation coefficient, and so on.

If the ANC earphones 100 repeatedly execute S210 to S240 in the above method 200 for many times during the turn-on and use of the ANC function of the ANC earphones 100 in the above method 200 for many times, and an updating method of S240 may be the same or different during the execution process of the method 200 for many times. For example, the ANC earphones 100 may determine the operation coefficient of the filter 140 by using a method of the corresponding relationship during the execution process of the ANC earphones 100 for many times; for another example, the ANC earphones 100 may also determine and update the operation coefficient in real time by an adaptive filter during the execution process of the ANC earphones 100 for many times; and for another example, the ANC earphones 100 may also first determine the operation coefficient of the filter 140 by using the method of corresponding relationship, and then determine and update the operation coefficient by the adaptive filter for many times during the execution process of the ANC earphones 100 for many times. An embodiment of the present application is not limited to this.

In addition, for different filters 140 in the ANC earphones 100, the operation coefficients may be determined in the same or different ways. For example, in order to facilitate the setting and simplification of the calculation process, different filters 140 of the ANC earphones 100 may be set to update the operation coefficient based on the corresponding relationship, or the adaptive filter may be used to update the operation coefficients. An embodiment of the present application is not limited to this.

It should be understood that in view of different application scenarios during the use of the ANC earphones 100, therefore, the method 200 of an embodiment of the present application may further include: determining an update step of the filter 140 according to a detection result of a wearing environment of the ANC earphones 100. That is, in the process of the ANC earphones 100 updating the operation coefficient of the filter 140, the update step of the filter 140 may be adjusted in real time through the detection result of the wearing environment to improve operating efficiency of the filter 140 of the ANC earphones 100 and make the noise cancellation effect of the ANC earphones 100 more stable.

Optionally, the detection of the wearing environment of the ANC earphones 100 in an embodiment of the present application may be flexibly set according to the actual application. For example, the detection result of the wearing environment of the ANC earphones 100 includes at least one of the following: a self-sounding detection result of a wearer, an ambient wind noise detection result and an earphones squeak detection result. Specifically, the self-sounding detection of the wearer may be used to detect whether the wearer of the ANC earphones 100 is speaking. For example, the ANC earphones 100 may include a self-sounding detection module to perform the self-sounding detection of the wearer. Correspondingly, the self-sounding detection result of the wearer may include a volume of the detected wearer's speaking voice. The ambient wind noise detection may be used to detect the sound of the wind in the current environment of the wearer of the ANC earphones 100. For example, the ANC earphones 100 may include an ambient wind noise detection module to perform the ambient wind noise detection. Correspondingly, the ambient wind noise detection results may include a volume of the detected sound of the wind of the user's current environment. The earphones squeak detection may be used to detect the squeak sound generated by the interference between the ANC earphones 100 and other settings. For example, the ANC earphones 100 may include an earphones squeak detection module to perform earphones squeak detection. Correspondingly, the earphones squeak detection result may include a volume of the detected squeak sound.

It should be understood that determining the update step of the filter 140 according to the detection result of the wearing environment of the ANC earphones 100 may specifically include: reducing the update step of the filter 140 when the detection result of the wearing environment of the ANC earphones 100 is greater than or equal to a preset value; and/or, increasing the update step of the filter 140 when the detection result of the wearing environment of the active noise cancellation earphones 100 is less than the preset value. Specifically, taking the self-sounding detection result of the wearer as an example, if the wearer is currently speaking, the speaking sound is likely to be incorrectly calculated as ambient noise by the ANC earphones 100. For example, the out-of-ear microphone 110 of the ANC earphones 100 may receive the speaking sound and calculate it as noise, thereby affecting the accuracy of the update of the operation coefficient of the filter 140. But in fact, the reason why the wearer may hear his or her own speaking voice is different from the reason why the wearer may hear the external environment sound. The transmission paths of the two sounds are different, and the wearer's own speaking voice does not need to be calculated as the external ambient noise. Therefore, based on the self-sounding detection result of the wearer, the update step of the filter 140 may be reduced when the self-sounding detection result of the wearer exceeds the preset value, that is, when the wearer speaks in a higher voice, to avoid a calculation error caused by the detection of the speaking voice as ambient noise, so as to ensure the stability of the noise cancellation effect of the ANC earphones 100; on the contrary, the update step of the filter 140 may also be increased when the self-sounding detection result of the wearer does not reach the preset value, that is, when the wearer speaks in a lower voice or does not speak, so as to improve the calculation accuracy.

Similarly, for the ambient wind noise detection result, if the ambient wind noise detection result exceeds the preset value, that is, an external ambient wind force of the wearer of the ANC earphones 100 is larger, the wind force may affect a calculation result of the filter 140 of the ANC earphones 100, so the effect of the ambient wind force on the calculation result may be reduced or avoided by reducing the update step of the filter 140; on the contrary, if the ambient wind noise detection result does not reach the preset value, that is, an external wind ambient force of the ANC earphones 100 wearer is smaller, the wind force may have a less impact on the calculation result of the filter 140 of the ANC earphones 100, then the update step of the filter 140 may be increased.

Similarly, for the earphones squeak detection result, if the earphones squeak detection result exceeds the preset value, that is, the interference between the ANC earphones 100 and other devices is larger, if this part of interference is repeatedly calculated as noise and the operation coefficient of the filter 140 of the ANC earphones 100 is continuously updated, the squeak sound will increase, so the impact of the squeak sound on the calculation result may be reduced or avoided by reducing the update step of the filter 140; on the contrary, if the earphones squeak detection result does not reach the preset value, that is, there is less or no interference between the ANC earphones 100 and other devices, then the squeak sound may be ignored, and it may have a less impact on the calculation result of the filter 140 of the ANC earphones 100, then the update step of the filter 140 may be increased.

Therefore, based on the above detection results of the wearing environment of the ANC earphones 100, the update step may be flexibly adjusted during the update process of the filter 140, thus improving the working efficiency of the filter 140, improving the stability of the noise cancellation effect of the ANC earphones 100, and thereby improving the wearer's experience of the ANC earphones 100.

It should be understood that the above text described that the operation coefficient of the filter 140 is determined based on the audio data played through the speaker 130 to be used in the noise cancellation process of the ANC earphones 100. Considering that during the used of the ANC earphones 100, the speaker 130 may also play other sounds, therefore, the operation coefficient of the filter 140 may also be determined based on other sounds played through the speaker 130. For example, when the wearer turns on the ANC function of the ANC earphones 100, the speaker 130 of the ANC earphones 100 may usually play a prompt tone to indicate the user that the ANC function of has been turned on through the prompt tone. Therefore, the operation coefficient of the filter 140 may also be determined based on the prompt tone data played through the speaker 130.

Figure 3:
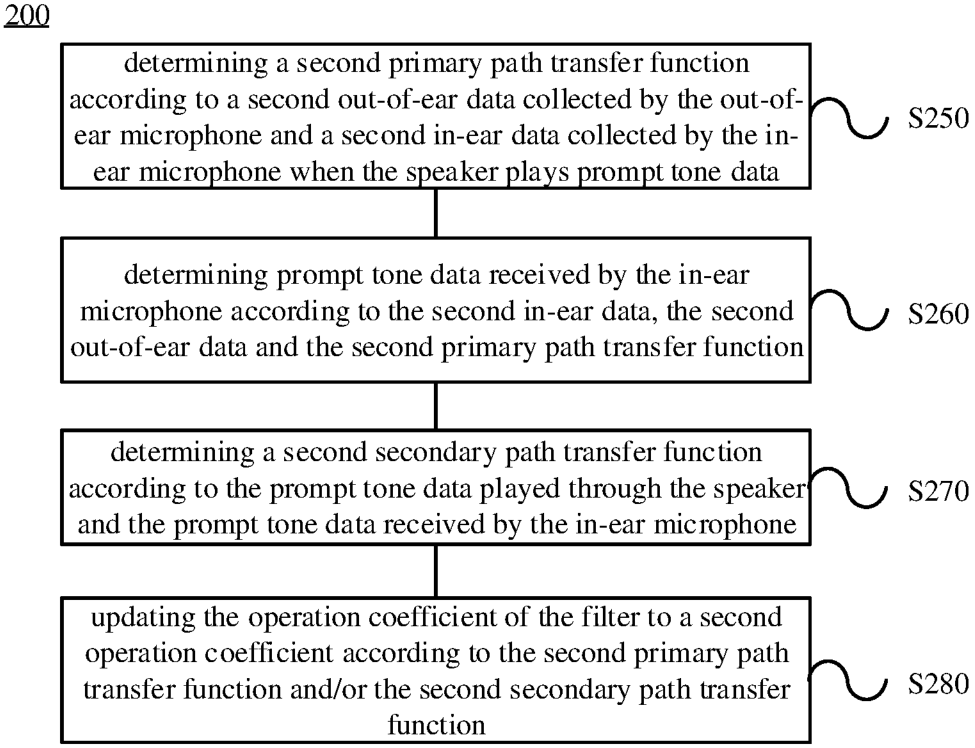
FIG. 3 is a schematic flowchart of at least part of the active noise cancellation method according to an embodiment of the present application.

Optionally, FIG. 3 shows a partial schematic flowchart of the method 200 of an embodiment of the present application. For example, steps S210 to S240 included in the method 200 shown in FIG. 2 are at least omitted in FIG. 3. As shown in FIG. 3, the method 200 of an embodiment of the present application further includes: S250, determining a second primary path transfer function according to a second out-of-ear data collected by the out-of-ear microphone 110 and a second in-ear data collected by the in-ear microphone 120 when the speaker plays prompt tone data, and the prompt tone data played through the speaker 130 being used to prompt a start of a noise cancellation function; S260, determining prompt tone data received by the in-ear microphone 120 according to the second in-ear data, the second out-of-ear data and the second primary path transfer function; S270, determining a second secondary path transfer function according to the prompt tone data played through the speaker 130 and the prompt tone data received by the in-ear microphone 120; and S280, updating the operation coefficient of the filter 140 to a second operation coefficient according to the second primary path transfer function and/or the second secondary path transfer function.

It should be understood that the prompt tone data played through the speaker 130 in an embodiment of the present application is used to prompt the user the turning on of the ANC function of the ANC earphones 100. Optionally, a specific sound of the prompt tone may be flexibly set according to the actual application, for example, the "prompt tone" may be "ding", "ANC ON", "noise cancellation turning on", "noise cancellation on", "in-ear", etc. At the same time, the prompt tone often has a richer spectrum, such as 300 Hz, 500 Hz, 1 KHz, 2 KHz, etc., and an embodiment of the present application is not limited to this.

Therefore, the noise cancellation method 200 for the ANC earphones 100 in an embodiment of the present application may determine the second primary path transfer function and the second secondary path transfer function according to the second out-of-ear data collected by the out-of-ear microphone 110 and the second in-ear data collected by the in-ear microphone 120 when the speaker 130 plays prompt tone data; then, update the operation coefficient of the filter 140 to the second operation coefficient according to the second primary path transfer function and/or the second secondary path transfer function. The method 200 determines the operation coefficient of the filter 140 according to the prompt tone data played through the speaker 130, which is fast and convenient, and may enable the user to obtain better noise cancellation experience in a shorter time, thereby improving user's satisfaction.

Optionally, the method 200 may further include: the second out-of-ear data is collected by the out-of-ear microphone 110 when the speaker 130 plays prompt tone data, where the second out-of-ear data may include the noise generated in the surrounding environment of the wearer, and may further include the audio component that the prompt tone data played through the speaker 130 collected by the out-of-ear microphone 110 leaks into the surrounding environment.

Optionally, the method 200 may further include: the second in-ear data is collected by the in-ear microphone 120 when the speaker 130 plays prompt tone data, where the second in-ear data may include the prompt tone data received by the in-ear microphone 120, and may further include noise data in the ear.

Optionally, the method 200 may include: collecting the second in-ear data by the in-ear microphone 120 while collecting the second out-of-ear data by the out-of-ear microphone 110 when the speaker 130 plays prompt tone data. An accuracy of a subsequently determined second primary path transfer function may be improved while collecting the second out-of-ear data and the second in-ear data at the same time.

In an embodiment of the present application, in S250, the second primary path transfer function may be determined according to the second out-of-ear data collected by the out-of-ear microphone 110 and the second in-ear data collected by the in-ear microphone 120, where the second primary path transfer function in an embodiment of the present application represents a transfer function from the out-of-ear microphone 110 to the in-ear microphone 120. Specifically, the method for determining a second primary path transfer function in an embodiment of the present application may be flexibly set according to the actual application, and may be the same or different from the method for determining the first primary path transfer function. For example, the S250 in the method 200 may specifically include: determining the second primary path transfer function through an adaptive filtering algorithm according to the second out-of-ear data and the second in-ear data. Where the adaptive filtering algorithm may be selected according to the actual application, for example, an LMS algorithm or an RLS algorithm may be selected, and an embodiment of the present application is not limited to this.

In an embodiment of the present application, in S260, determining prompt tone data received by the in-ear microphone 120 according to the second in-ear data, the second out-of-ear data and the second primary path transfer function, where the prompt tone data received by the in-ear microphone 120 represents part data of the first in-ear data received by the in-ear microphone 120, and this part of data is the prompt tone data received by the in-ear microphone 120 after the prompt tone data being played through the speaker 130.

Optionally, the S260 may specifically include: determining a second in-ear passive noise data according to the second out-of-ear data and the second primary path transfer function; and determining prompt tone data received by the in-ear microphone 120 according to the second in-ear data and the second in-ear passive noise data. Specifically, since the second out-of-ear data collected by the out-of-ear microphone 110 mainly includes ambient noise out of the ear, the second in-ear passive noise data may be estimated and determined based on the second out-of-ear data and the second primary path transfer function, where the second in-ear passive noise data represents a noise signal or noise data that may exist in the ear. In this way, since the second in-ear data collected by the in-ear microphone 120 includes the second in-ear passive noise data and the prompt tone data received by the in-ear microphone 120, the prompt tone data received by the in-ear microphone 120 may be determined based on the determined second in-ear passive noise data and the second in-ear data.

For example, determining prompt tone data received by the in-ear microphone 120 according to the second in-ear data and the second in-ear passive noise data may specifically include: determining a difference between the second in-ear data and the second in-ear passive noise data as the prompt tone data received by the in-ear microphone 120, that is, the prompt tone data received by the in-ear microphone 120 may be obtained by the means of the second in-ear data subtracting the determined second in-ear passive noise data.

In this way, in S270, determining a second secondary path transfer function according to the prompt tone data played through the speaker 130 and the prompt tone data received by the in-ear microphone 120, where the second secondary path transfer function represents a transfer function from the speaker 130 to the in-ear microphone 120. Specifically, the method for determining a second secondary path transfer function in an embodiment of the present application may be flexibly set according to the actual application. For example, S270 in the method 200 may specifically include: determining the second secondary path transfer function according to the prompt tone data played through the speaker 130 and the prompt tone data received by the in-ear microphone 120. Where the adaptive filtering algorithm may be selected according to the actual application, for example, an LMS algorithm or an RLS algorithm may be selected; moreover, an algorithm for determining the second primary path transfer function may be the same or different from an algorithm for determining the second secondary path transfer function, the algorithm for determining the second secondary path transfer function may be the same or different from the algorithm for determining the first secondary path transfer function, and an embodiment of the present application is not limited to this.

In an embodiment of the present application, in S280, updating the operation coefficient of the filter 140 to a second operation coefficient according to the second primary path transfer function and/or the second secondary path transfer function. Specifically, the operation coefficient of the filter 140 may be determined by reasonably selecting any method based on the actual application according to the determined second primary path transfer function and/or the second secondary path transfer function.

Optionally, as an embodiment, the second operation coefficient may be determined according to the preset corresponding relationship. Specifically, the S280 may specifically include: determining the second operation coefficient corresponding to the second primary path transfer function according to corresponding relationships between different primary path transfer functions and different operation coefficients of the filter 140, and updating the operation coefficient of the filter 140 to the second operation coefficient; and/or, determining the second operation coefficient corresponding to the second secondary path transfer function according to corresponding relationships between different secondary path transfer functions and different operation coefficients of the filter 140, and updating the operation coefficient of the filter 140 to the second operation coefficient.

It should be understood that the method of determining the second operation coefficient according to the preset corresponding relationship is similar to the method of determining the first operation coefficient according to the preset corresponding relationship. For simplicity, it will not be repeated here. For example, an operation coefficient corresponding to the second primary path transfer function may be determined as the second operation coefficient according to the preset corresponding relationship between different primary path transfer functions and different operation coefficients of the filter 140. Alternatively, an operation coefficient corresponding to the second secondary path transfer function may be determined as the second operation coefficient according to the preset corresponding relationship between different secondary path transfer functions and different operation coefficients of the filter 140. For another example, the preset corresponding relationship may also include the primary path transfer function and the secondary path transfer function at the same time, that is, the operation coefficients corresponding to the second primary path transfer function and the second secondary path transfer function are determined as the second operation coefficient according to the preset corresponding relationship between different operation coefficients of the filter 140 and different primary path transfer functions and the secondary path transfer functions.

Optionally, for different filters in the ANC earphones 100, a corresponding operation coefficient may be determined according to the same or different corresponding relationship described above. For example, for the FF filter, a second operation coefficient of the FF filter may be determined according to the corresponding relationship between different operation coefficients of the FF filter and different primary path transfer functions and the secondary path transfer functions. For another example, for the FB filter, an operation coefficient of the FB filter may be determined and updated as the second operation coefficient according to the preset corresponding relationship between different secondary path transfer functions and different operation coefficients of the FB filter. For another example, for the SP filter, an operation coefficient of the SP filter may be determined and updated as the second operation coefficient according to the preset corresponding relationship between different secondary path transfer functions and different operation coefficients of the SP filter, but an embodiment of the present application is not limited to this.

Optionally, as another embodiment, an adaptive filter may be used to calculate the operation coefficient of the filter 140 in real time. Specifically, the filter 140 in an embodiment of the present application is an adaptive filter, that is, any filter 140 in an embodiment of present application may use an adaptive filter, and for example, an FIR filter or an IIR filter may be used. In this way, the adaptive filter may update the currently used operation coefficient to the second operation coefficient according to the determined second primary path transfer function and/or the second secondary path transfer function.

It should be understood that steps S250 to S280 in the embodiments of the present application may be executed before and/or after steps S210 to S240. For example, when the wearer of the ANC earphones 100 turns on the ANC function, the speaker 130 may play the prompt tone data. Therefore, steps S250 to S280 of the method 200 in the embodiments of the present application may be executed based on the prompt tone data played through the speaker 130; and after that, after the prompt tone is played, that is, after the ANC function is turned on, the speaker 130 may also normally play the audio data, that is, steps S210 to S240 of the method 200 in the embodiments of the present application may be executed based on the audio data played through the speaker 130. At this time, since the ANC earphones 100 first determines the second operation coefficient based on the prompt tone data played through the speaker 130, and then determines the first operation coefficient based on the audio data played through the speaker 130, correspondingly, the updating the operation coefficient of the filter 140 to the first operation coefficient in S240 may specifically include: updating the operation coefficient of the filter 140 from the second operation coefficient to the first operation coefficient. In addition, the ANC earphones 100 may also update the operation coefficient of the filter 140 in real time based on different audio data played through the speaker 130.

For another example, when the wearer of the ANC earphones 100 turns on the ANC function, the speaker 130 may also normally play the audio data before the speaker 130 plays the prompt tone data, that is, steps S210 to S240 of the method 200 in the embodiments of the present application may be executed based on the audio data played through the speaker 130; and after that, the speaker 130 plays the prompt tone data, and steps S250 to S280 of the method 200 in the embodiments of the present application may be executed based on the prompt tone data played through the speaker 130. At this time, since the ANC earphones 100 first determines the first operation coefficient based on the audio data played through the speaker 130, and then determines the second operation coefficient based on the prompt tone data played through the speaker 130, correspondingly, the updating the operation coefficient of the filter 140 to the second operation coefficient in S280 may specifically include: updating the operation coefficient of the filter 140 from the first operation coefficient to the second operation coefficient. In addition, after the speaker 130 of the ANC earphones 100 playing the prompt tone data, steps S210 to S240 of the above method 200 may be executed for many times based on other audio data normally played through the speaker 130 to update the operation coefficient of the filter 140 in real time.

Therefore, the noise cancellation method 200 for the ANC earphones 100 in an embodiment of the present application may determine the second primary path transfer function and the second secondary path transfer function according to the second out-of-ear data collected by the out-of-ear microphone 110 and the second in-ear data collected by the in-ear microphone 120 when the speaker 130 plays prompt tone data; then, update the operation coefficient of the filter 140 to the second operation coefficient according to the second primary path transfer function and/or the second secondary path transfer function. In addition, it may determine the first primary path transfer function and the first secondary path transfer function according to the first out-of-ear data collected by the out-of-ear microphone 110 and the first in-ear data collected by the in-ear microphone 120 when the speaker 130 normally plays the audio data; then, update the operation coefficient of the filter 140 to the first operation coefficient according to the first primary path transfer function and/or the first secondary path transfer function. The method 200 may be applied to any stage when the ANC earphones 100 play the prompt tone data through the speaker 130 and normally play the audio data through the speaker 130, and may be executed many times to realize real-time update of the operation coefficient of the filter 140 during the use of the ANC earphones 100. In this way, even if the environment changes or the locations of the ANC earphones 100 and ear canals changes during the use of the ANC earphones 100 by the wearer, the operation coefficient of the filter 140 may be updated in real time through the method 200, and then the noise cancellation effect of the ANC earphones 100 may be adjusted to make the wearer have a good use experience. In addition, the method 200 determines the operation coefficient of the filter 140 according to the audio data played through the speaker 130 without adding an additional or a specific audio signal. For example, it does not need to add an audio signal outside a hearing range of the wearer, which may not only simplify the ANC earphones 100, but also may avoid an impact of the additional audio signal on the wearer, and may not only ensure the noise cancellation effect of the ANC earphones 100, but also ensure the wearer's using experience.

It should be understood that the method 200 of an embodiment of the present application may be executed by a processor, for example, it may be executed by a processor 150 of the ANC earphones 100 shown in FIG. 1. It should be understood that the processor of an embodiment of the present application may be an integrated circuit chip with signal processing capability. In the implementation process, each step of the above method embodiments may be completed by an integrated logic circuit of hardware in the processor or an instruction in a form of software. The above processor may be a general purpose processors, a digital signal processors (DSP), an application specific integrated circuit (ASICs), a field programmable gate array (FPGA) or other programmable logic devices, discrete gate or transistor logic devices, and discrete hardware components. Each method, step and logic block diagram disclosed in an embodiment of the present application may be implemented or executed. The general purpose processor may be a microprocessor or the processor may also be any conventional processor. The steps of the method disclosed in combination with an embodiment of the present application may be directly reflected in the completion of a hardware decoding processor or the combination of hardware and software modules in the decoding processor. A software module may be located in a random access memory, a flash memory, a read-only memory, a programmable read-only memory or an electrically erasable programmable memory, a register and other mature storage media in the field. The storage medium is located in the memory, and the processor reads the information in the memory, and completes the steps of the above method in combination with its hardware.

An embodiment of the present application further provides a computer-readable storage medium for storing a computer program. Optionally, the computer-readable storage medium may be applied to the ANC earphones 100 in an embodiment of the present application, and the computer program cause the earphones to implement corresponding processes implemented by the ANC earphones 100 in each method in an embodiment of the present application, which will not be repeated redundantly herein for brevity.

An embodiment of the present application further provides a computer program product, including computer program instructions. Optionally, the computer program product may be applied to the ANC earphones 100 in an embodiment of the present application, and the computer program instructions cause the earphones to implement corresponding processes implemented by the ANC earphones 100 in each method in an embodiment of the present application, which will not be repeated redundantly herein for brevity.

An embodiment of the present application also provides a computer program. Optionally, the computer program may be applied to the ANC earphones 100 in the embodiments of the present application, and when the computer program is running in the earphones, the earphones may be caused to implement corresponding processes implemented by the ANC earphones 100 in each method in the embodiments of the present application, which will not be repeated herein for brevity.

Those of ordinary skill in the art may be aware that, units and algorithm steps of the examples described in the embodiments disclosed herein may be implemented by electronic hardware, or a combination of computer software and computer software. Whether these functions are performed by hardware or software depends on particular applications and designed constraint conditions of the technical solutions. Persons skilled in the art may use different methods to implement the described functions for every particular application, but it should not be considered that such implementation goes beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in other manners. For example, the above described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Some or all of the units may be selected to achieve the purposes of the solutions in the present embodiments according to actual needs.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods in the embodiments of the present application. The foregoing storage medium includes: any medium that may store program code, such as a USB flash drive, a removable hard disk, a read-only memory (ROM), a random access memory (RAM), a magnetic disk, or an optical disc.

The foregoing description is only a specific embodiment of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. An active noise cancellation method for active noise cancellation earphones, wherein the active noise cancellation earphones comprise an in-ear microphone, an out-of-ear microphone, a speaker and a filter, and the method comprises:

determining a first primary path transfer function according to a first out-of-ear data collected by the out-of-ear microphone and a first in-ear data collected by the in-ear microphone when the speaker plays first audio data;

determining second audio data received by the in-ear microphone according to the first in-ear data, the first out-of-ear data and the first primary path transfer function;

determining a first secondary path transfer function according to the first audio data and the second audio data; and updating an operation coefficient of the filter to a first operation coefficient according to the first primary path transfer function and/or the first secondary path transfer function.

2. The method according to claim 1, wherein the updating an operation coefficient of the filter to a first operation coefficient according to the first primary path transfer function and/or the first secondary path transfer function comprises:

determining the first operation coefficient corresponding to the first primary path transfer function according to corresponding relationships between different primary path transfer functions and different operation coefficients of the filter, and updating the operation coefficient of the filter to the first operation coefficient; and/or, determining the first operation coefficient corresponding to the first secondary path transfer function according to corresponding relationships between different secondary path transfer functions and different operation coefficients of the filter, and updating the operation coefficient of the filter to the first operation coefficient.

3. The method according to claim 1, wherein the method further comprises:

determining an update step of the filter according to a detection result of a wearing environment of the active noise cancellation earphones;

wherein the detection result of the wearing environment of the active noise cancellation earphones comprises at least one of the followings: a self-sounding detection result of an earphones wearer, an ambient wind noise detection result and an earphones squeak detection result.

4. The method according to claim 3, wherein the determining an update step of the filter according to a detection result of a wearing environment of the active noise cancellation earphones comprises:

reducing the update step of the filter when the detection result of the wearing environment of the active noise cancellation earphones is greater than or equal to a preset value; and/or, increasing the update step of the filter when the detection result of the wearing environment of the active noise cancellation earphones is less than the preset value.

5. The method according to claim 1, wherein the determining second audio data according to the first in-ear data, the first out-of-ear data and the first primary path transfer function comprises:

determining a first in-ear passive noise data according to the first out-of-ear data and the first primary path transfer function; and determining the second audio data according to the first in-ear data and the first in-ear passive noise data.

6. The method according to claim 5, wherein the determining the second audio data according to the first in-ear data and the first in-ear passive noise data comprises:

determining a difference between the first in-ear data and the first in-ear passive noise data as the second audio data.

7. The method according to claim 1, wherein the method further comprises:

collecting the first in-ear data by the in-ear microphone while collecting the first out-of-ear data by the out-of-ear microphone when the speaker plays the first audio data.

8. The method according to claim 1, wherein the method further comprises:

determining a second primary path transfer function according to a second out-of-ear data collected by the out-of-ear microphone and a second in-ear data collected by the in-ear microphone when the speaker plays prompt tone data, and the prompt tone data played through the speaker being configured to prompt a start of a noise cancellation function;

determining prompt tone data received by the in-ear microphone according to the second in-ear data, the second out-of-ear data and the second primary path transfer function;

determining a second secondary path transfer function according to the prompt tone data played through the speaker and the prompt tone data received by the in-ear microphone; and updating the operation coefficient of the filter to a second operation coefficient according to the second primary path transfer function and/or the second secondary path transfer function.

9. The method according to claim 8, wherein the updating the operation coefficient of the filter to a second operation coefficient according to the second primary path transfer function and/or the second secondary path transfer function comprises:

determining the second operation coefficient corresponding to the second primary path transfer function according to corresponding relationships between different primary path transfer functions and different operation coefficients of the filter, and updating the operation coefficient of the filter to the second operation coefficient; and/or, determining the second operation coefficient corresponding to the second secondary path transfer function according to corresponding relationships between different secondary path transfer functions and different operation coefficients of the filter, and updating the operation coefficient of the filter to the second operation coefficient.

10. The method according to claim 8, wherein the updating the operation coefficient of the filter to a second operation coefficient comprises:

updating the operation coefficient of the filter from the first operation coefficient to the second operation coefficient.

11. The method according to claim 8, wherein the updating an operation coefficient of the filter to a first operation coefficient comprises:

updating the operation coefficient of the filter from the second operation coefficient to the first operation coefficient.

12. Active noise cancellation earphones, wherein the active noise cancellation earphones comprise: an in-ear microphone, an out-of-ear microphone, a speaker, a filter and a processor, and the processor is configured to:

determine a first primary path transfer function according to a first out-of-ear data collected by the out-of-ear microphone and a first in-ear data collected by the in-ear microphone when the speaker plays first audio data;

determine second audio data received by the in-ear microphone according to the first in-ear data, the first out-of-ear data and the first primary path transfer function;

determine a first secondary path transfer function according to the first audio data and the second audio data; and update an operation coefficient of the filter to a first operation coefficient according to the first primary path transfer function and/or the first secondary path transfer function.

13. The active noise cancellation earphones according to claim 12, wherein the processer is configured to:

determine the first operation coefficient corresponding to the first primary path transfer function according to corresponding relationships between different primary path transfer functions and different operation coefficients of the filter, and update the operation coefficient of the filter to the first operation coefficient; and/or, determine the first operation coefficient corresponding to the first secondary path transfer function according to corresponding relationships between different secondary path transfer functions and different operation coefficients of the filter, and update the operation coefficient of the filter to the first operation coefficient.

14. The active noise cancellation earphones according to claim 12, wherein the processer is further configured to:

determine an update step of the filter according to a detection result of a wearing environment of the active noise cancellation earphones;

wherein the detection result of the wearing environment of the active noise cancellation earphones comprises at least one of the followings: a self-sounding detection result of an earphones wearer, an ambient wind noise detection result and an earphones squeak detection result.

15. The active noise cancellation earphones according to claim 14, wherein the processer is configured to:

reduce the update step of the filter when the detection result of the wearing environment of the active noise cancellation earphones is greater than or equal to a preset value; and/or, increase the update step of the filter when the detection result of the wearing environment of the active noise cancellation earphones is less than the preset value.

16. The active noise cancellation earphones according to claim 12, wherein the processer is configured to:

determine a first in-ear passive noise data according to the first out-of-ear data and the first primary path transfer function; and determine the second audio data according to the first in-ear data and the first in-ear passive noise data.

17. The active noise cancellation earphones according to claim 12, wherein the processer is configured to:

collect the first in-ear data by the in-ear microphone while collecting the first out-of-ear data by the out-of-ear microphone when the speaker plays the first audio data.

18. The active noise cancellation earphones according to claim 12, wherein the processer is further configured to:

determine a second primary path transfer function according to a second out-of-ear data collected by the out-of-ear microphone and a second in-ear data collected by the in-ear microphone when the speaker plays prompt tone data, and the prompt tone data played through the speaker being configured to prompt a start of a noise cancellation function;

determine prompt tone data received by the in-ear microphone according to the second in-ear data, the second out-of-ear data and the second primary path transfer function;

determine a second secondary path transfer function according to the prompt tone data played through the speaker and the prompt tone data received by the in-ear microphone; and update the operation coefficient of the filter to a second operation coefficient according to the second primary path transfer function and/or the second secondary path transfer function.

19. The active noise cancellation earphones according to claim 18, wherein the processer is configured to:

determine the second operation coefficient corresponding to the second primary path transfer function according to corresponding relationships between different primary path transfer functions and different operation coefficients of the filter, and update the operation coefficient of the filter to the second operation coefficient; and/or, determine the second operation coefficient corresponding to the second secondary path transfer function according to corresponding relationships between different secondary path transfer functions and different operation coefficients of the filter, and update the operation coefficient of the filter to the second operation coefficient.

20. The active noise cancellation earphones according to claim 18, wherein the processer is configured to:

update the operation coefficient of the filter from the first operation coefficient to the second operation coefficient; or update the operation coefficient of the filter from the second operation coefficient to the first operation coefficient.

* * * * *